No. 751,271. PATENTED FEB. 2, 1904.
V. ELTZ.
APPARATUS FOR HEATING AIR OR LIQUIDS TO A CONSTANT TEMPERATURE.
APPLICATION FILED JUNE 18, 1902.
NO MODEL. 2 SHEETS—SHEET 1.

No. 751,271. PATENTED FEB. 2, 1904.
V. ELTZ.
APPARATUS FOR HEATING AIR OR LIQUIDS TO A CONSTANT TEMPERATURE.
APPLICATION FILED JUNE 18, 1902.
NO MODEL. 2 SHEETS—SHEET 2.
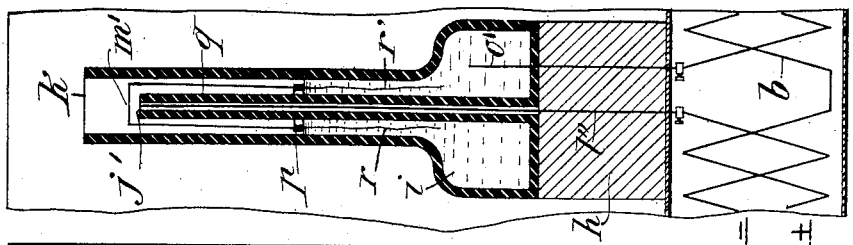
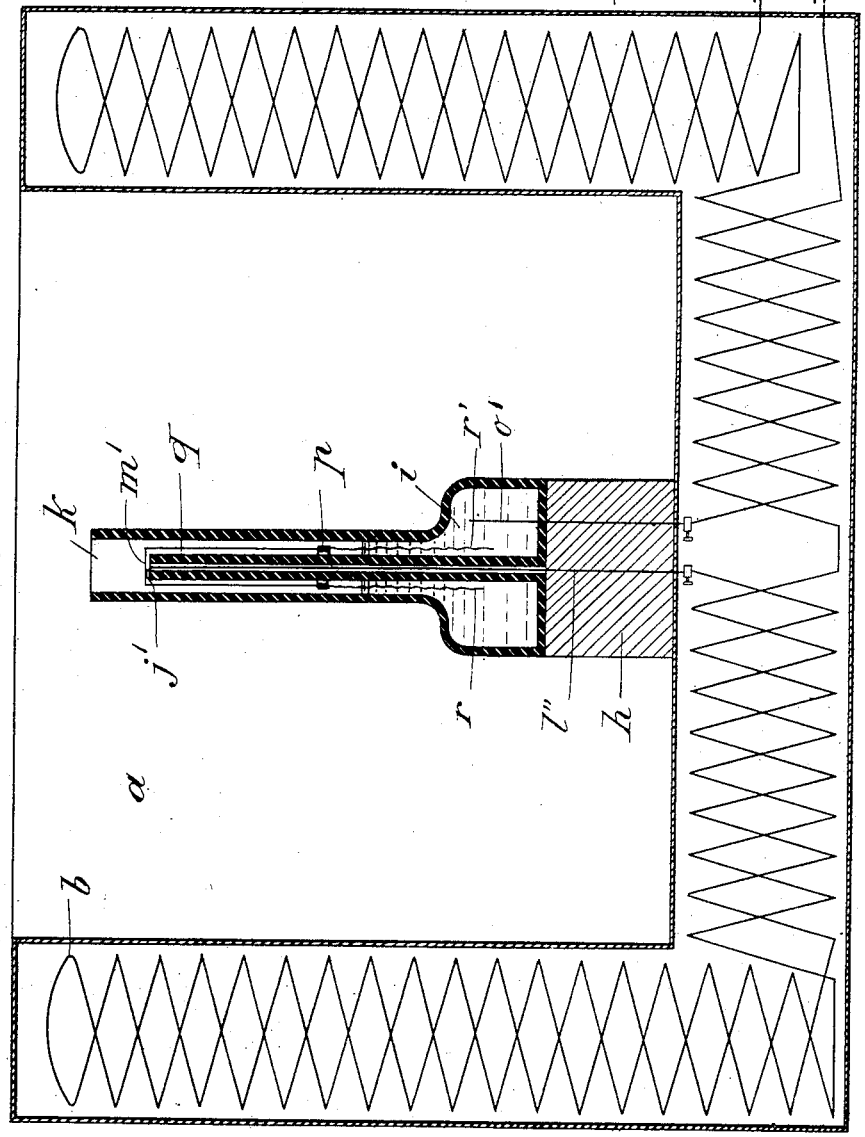
Witnesses:
C. Heymann
L. Haldman
Inventor:
Victor Eltz
by B. Singer Attorney No. 751,271.       Patented February 2, 1904.

UNITED STATES PATENT OFFICE.

VICTOR ELTZ, OF ABBAZIA, AUSTRIA-HUNGARY.

APPARATUS FOR HEATING AIR OR LIQUIDS TO A CONSTANT TEMPERATURE.

SPECIFICATION forming part of Letters Patent No. 751,271, dated February 2, 1904.

Application filed June 18, 1902. Serial No. 112,251. (No model.)

*To all whom it may concern:*

Be it known that I, VICTOR ELTZ, a subject of the Emperor of Austria-Hungary, and a resident of Abbazia, Austria-Hungary, have invented certain new and useful Improvements in Apparatus for Heating Air or Liquids to a Constant Temperature, of which the following is a specification.

This invention has for its object the raising of air or liquid in a confined space or receptacle to a given temperature and the automatic maintenance of such temperature constant during any indefinite lapse of time. The principle of this apparatus, which can be utilized for the pasteurization of liquids, for hatching-ovens, for air-baths, water-baths, or chemical processes, and the like, consists in automatically cutting out of an electrical circuit by the breaking of the current an arrangement of electrical heating-coils so soon as the air or liquid contained in the heating-receptacle has reached the required temperature, while at the same time the heating is automatically renewed when the temperature falls below that desired. I employ an arrangement which serves absolutely to break the entire circuit, which is not reëstablished until further heating is required. In this way waste of current is avoided when heating is not required. This arrangement is effected by the aid of a good liquid-conductor of electricity, which dilates under rise of temperature and is in series with the heating-coils. This liquid-conductor floats a movable contact, which rises from a fixed contact as soon as the required temperature is attained, while the fall of the temperature, causing the contraction of the liquid-conductor, allows the movable contact to fall and reëstablish the heating-circuit again.

In order that my invention may be the better understood, I now proceed to describe the same with reference to the drawings hereto annexed and to the letters marked thereon, which show various specific arrangements, by way of example, for carrying out said invention.

Figure 1:
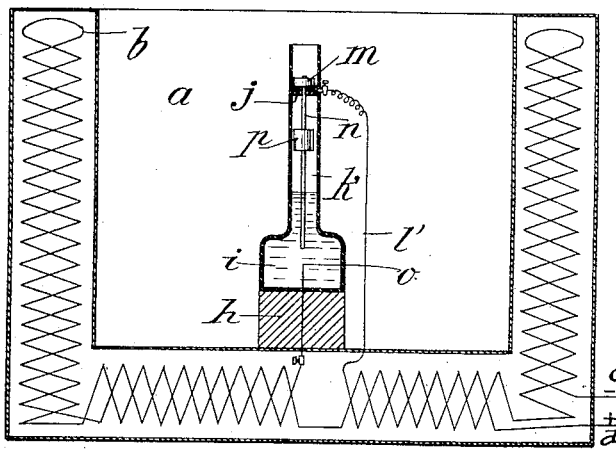
Figure 2:
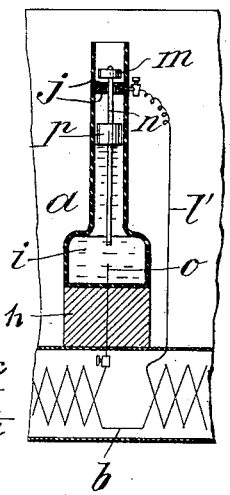

Figure 1 is a section through apparatus embodying my invention, showing the circuit closed and the heating-coils in action. Fig. 2 is a sectional detail showing the apparatus with the circuit interrupted. Fig. 3 is a section similar to that in Fig. 1 of an alternative form of the apparatus with the circuit closed; and Fig. 4 is a sectional detail of the construction indicated in the immediately preceding figure, showing the circuit open.

In all the figures $a$ represents a convenient receptacle for liquid to be heated, such as milk to be pasteurized; but this receptacle may be modified in any way to suit any purpose for air or liquid heating to which it may be applied. It is provided with heating-coils $b$, connected to terminals $c$ $d$ of an external circuit carrying an electrical current from any convenient source. In the receptacle upon a non-heat-conducting block $h$ is placed a bottle of insulating material having a lower chamber $i$, containing mercury, communicating, as in a thermometer, with an elonged neck $k$ of small relative area partially filled with the mercury. In Figs. 1 and 2 the neck $k$ carries in its interior an insulated ring $j$, of good electrical conducting material, of which the upper face is exposed for contact and the rest insulated. This ring forms a fixed contact connected in series in the heating-coils by the wire $l'$. The movable contact is formed by a metallic rod $n$ within the neck $k$, of which the lower extremity is immersed always in the mercury and the upper part is provided with a metallic piston $m$ above the ring $j$ and a float $p$ below the ring. The main body of mercury in the bottle $i$ is conductively connected by the wire $o$ to the heating-coils $b$. So long as the temperature in the receptacle $a$ has not reached the desired degree the piston $m$ rests upon the fixed contact-ring $j$, the hole in the center of the ring being so large that the rod $n$ does not touch the ring. The circuit through the mercury is thus closed, and the heating-coils become incandescent. In proportion as the temperature rises in the receptacle the column of mercury rises until it lifts the float $p$, and thus the rod $n$ and piston-contact $m$, which as it leaves the ring $j$ breaks the circuit through the heating-coils, and thus extinguishes the latter, as in Fig. 2. If the temperature in the receptacle $a$ then lowers, the column of mercury drops, and the contact between $m$ and $j$ is restored, reforming the circuit through the heating-coils.

The arrangement in Figs. 3 and 4 differs only from the above-described arrangement in that the fixed contact is made on the end of the wire $l''$, passing through an insulating-tube $q$ up the center of the bottle and neck to the point $j'$ or top of said tube. The movable contact in this case is a cap $m'$, normally resting upon tube $q$ at point $j''$, and the end of the wire $l''$, the cap being connected by wires to an annular float $p$ and having depending therefrom wires $r$ $r'$, always immersed in the mercury, which is also connected to the heating-coils $b$ in series by the wire $o'$. The action of this apparatus is the same as that described in relation to Figs. 1 and 2. So soon as the temperature rises above that required the mercury which dilates lifts the contact-cap $m'$ from the end of the wire $l''$, as shown in Fig. 4, and the entire circuit is broken until the fall of the temperature permits the cap $m'$ to again close the circuit through $l''$.

Having now fully described my said invention, what I claim, and desire to secure by Letters Patent, is—

In apparatus for heating air or liquids, the combination of an electric circuit, a source of electric energy connected in the circuit, a heating-coil embraced in the circuit, a column of liquid metal forming the terminal of one side of the circuit and exposed to the heat-rays, a terminal for the other side vertically thereabove, a float resting upon said column, and a contact supported by said float, normally in electric connection with said latter terminal, and constantly conductively related to the first terminal, whereby the dilation of the liquid column under the influence of excessive heat tends to break the contact with the second terminal and open the circuit.

In testimony whereof I have hereunto set my hand in presence of two witnesses.

VICTOR ELTZ.

Witnesses:
ROBERT GORVANY,
JOSEPH J. ZITKEN.